Nov. 6, 1956  W. HERSCOVITCH  2,769,526
CONVEYORS
Filed Sept. 13, 1954  3 Sheets-Sheet 1
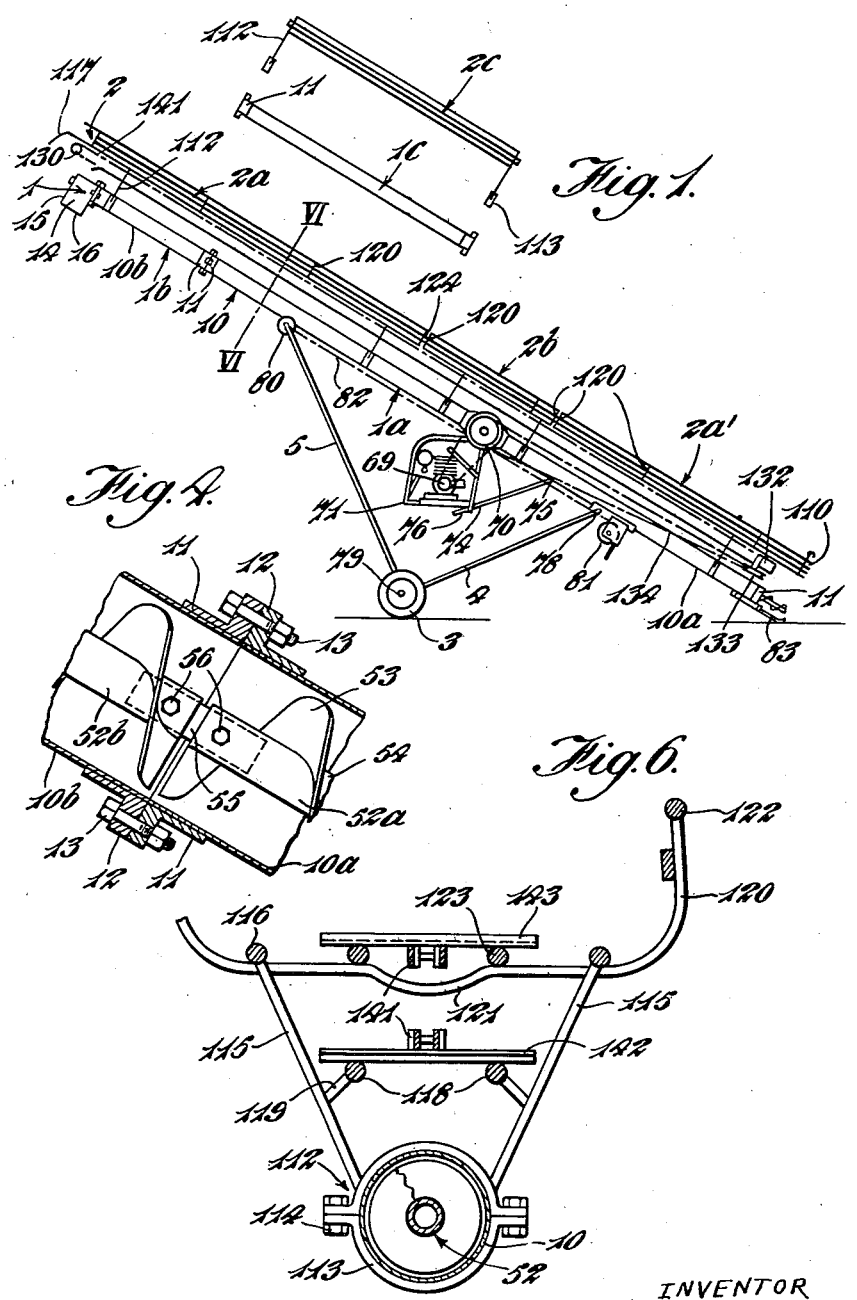
INVENTOR
William Herscovitch
By Watson, Cole, Grindle &
Watson
ATTORNEYS

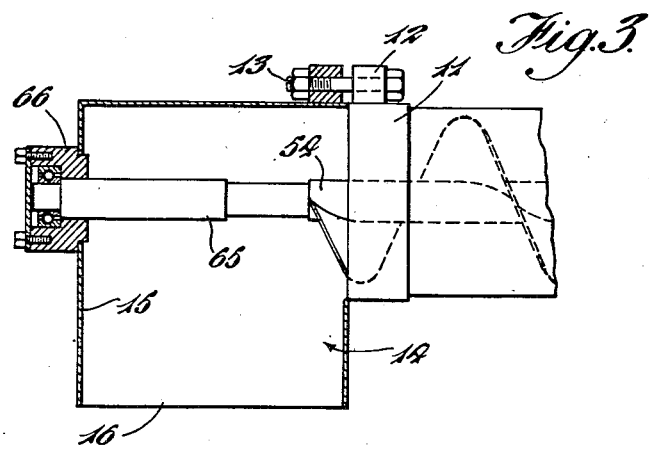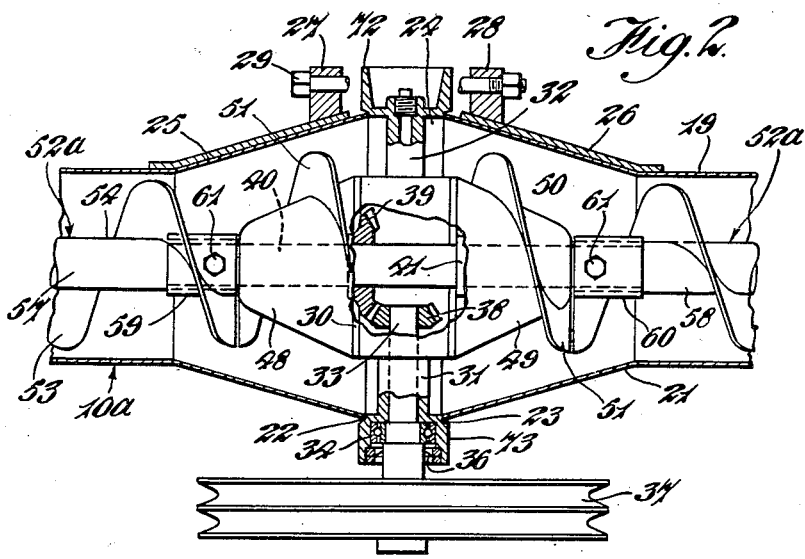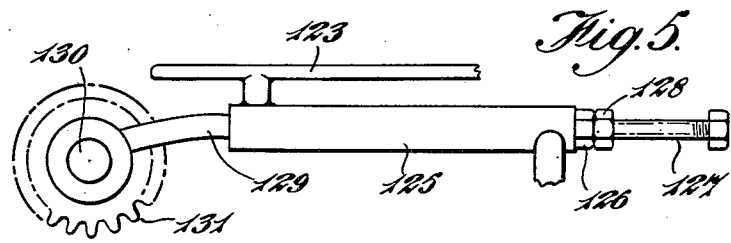

Nov. 6, 1956   W. HERSCOVITCH   2,769,526
CONVEYORS
Filed Sept. 13, 1954   3 Sheets-Sheet 3

INVENTOR
WILLIAM HERSCOVITCH
BY Watson, Cole, Grindle and Watson
ATTORNEYS

United States Patent Office 2,769,526
Patented Nov. 6, 1956

2,769,526
CONVEYORS

William Herscovitch, Mont Albert, Victoria, Australia

Application September 13, 1954, Serial No. 455,561

6 Claims. (Cl. 198—75)

This invention relates to conveyors and particularly, though not exclusively, to portable conveyors.

One object of the invention is to provide a portable auger conveyor for handling bulk material which is made in detachable sections so that it may be lengthened or shortened as may be needed for a particular conveying operation. It is another object of the invention to provide an improved drive arrangement for an auger conveyor, particularly (but not exclusively) applicable to a portable sectional auger conveyor. A further object is to provide a combination auger and endless conveyor and particularly a portable sectional combination conveyor.

A preferred embodiment of the invention will now be described by way of example with reference to the accompanying drawings, in which:

Figure 1 is a side elevation of a portable sectional combination auger and endless chain conveyor;

Figure 2 is a sectional plan view, to a larger scale, of a gear box and related parts of the conveyor, other parts thereof being omitted from this view;

Figure 3 is a longitudinal sectional view, to a larger scale than that of Figure 1, of the discharge end of the auger conveyor;

Figure 4 is a view, similar to Figure 3, of another part of the auger conveyor;

Figure 5 is a view, similar to Figure 3, of a part of the chain conveyor;

Figure 6 is an enlarged transverse section of the combination conveyor taken on the line VI—VI in Figure 1;

Figure 7:
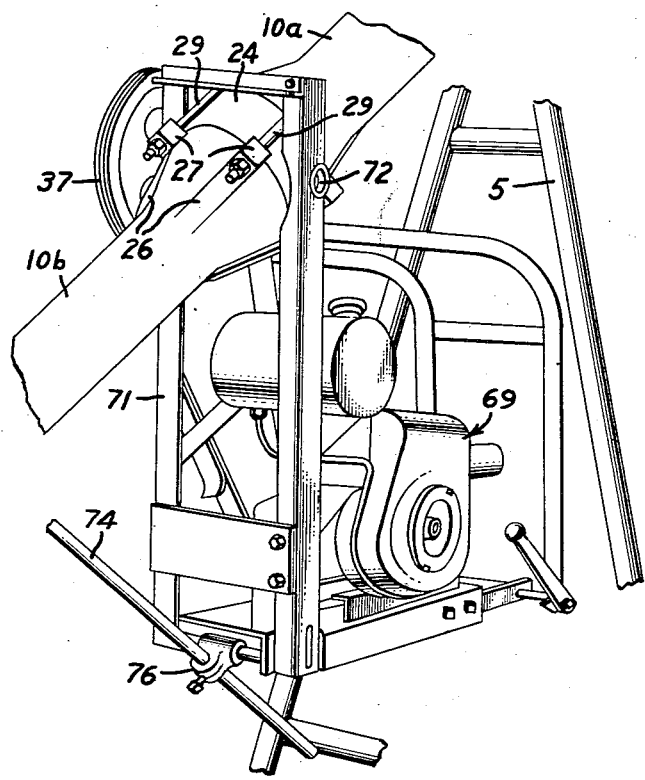
Figure 7 is a perspective view of part of the conveyor seen from the side opposite the viewpoint for Figure 1.

The conveyor illustrated in the drawings comprises an auger conveyor designated generally 1, and an endless chain conveyor designated generally 2 mounted on, and above, the conveyor 1. The combinatoin conveyor is rendered portable by means of transport wheels 3 carried by generally A-shaped frames 4 and 5. The auger conveyor comprises two detachable sections, a main and a first subsidiary section designated respectively 1a and 1b. A second subsidiary section denoted 1c is shown at the left hand in Figure 1. Either the first or the second subsidiary section or both such sections can be detachably secured at the upper or lower end of the main section.

The endless chain conveyor comprises three detachable sections designated 2a, 2a', which together are equal in length to the main auger conveyor section 1a, and 2b which is equal in length to the auger conveyor section 1b. A further chain conveyor section 2c equal in length to the auger conveyor section 1c is shown on the left in Figure 1. The chain conveyor sections may be combined to match any length of auger conveyor, either section 2b or 2c or both being assembled between sections 2a and 2a'. The endless chain conveyor can be removed and the auger conveyor used alone.

The auger conveyor 1, consisting of the main and subsidiary sections 1a and 1b, will first be described. The conveyor (Figure 1) comprises a tube 10 formed in a main and subsidiary section respectively 10a, 10b; a ring 11 (Figure 4) carrying four lugs 12 is secured to each end of each tube section and the two sections are secured together by bolts 13 passing through holes in the lugs. An outlet member 14 (Figure 3) is secured at the upper end of the tube section 1b and provides an end wall 15 opposite the upper end of the tube 10 and a side discharge opening 16.

The main tube section 10a is formed in two parts 18, 19 (Figure 2) which are symmetrically flared at their adjacent ends, as shown at 20, 21. The extremities of the flared ends 20, 21 are received against shoulders 22, 23 formed in a mounting ring 24 and the tube parts 18, 19 are maintained in assembled relation by a series of reinforcement strips 25, 26 welded to the flared ends and carrying opposed lugs 27, 28 secured together by bolts 29. So as to illustrate more clearly in Figure 2 the reinforcement strips 25 and associated parts, one pair of strips has been shown as if in the section plane. In fact, as will be understood, to clear the parts 72, 73 which are described in detail below, the strips are spaced angularly from this plane. A gear box 30 is supported symmetrically within the mounting ring 24 by a pair of diametrally opposed hollow struts 31, 32 projecting from the ring. An input shaft 33 of the gear box 30 extends through the strut 31 and is supported by ball bearings at either end of the strut only one such bearing, 34, being shown: the end of the shaft projecting to the exterior of the tube 10a passes through an oil seal 36 and carries a large diameter double groove pulley 37, while the inner end of the shaft carries a bevel gear 38 meshing with another bevel gear 39 of greater diameter keyed to an output shaft 40 extending axially of the tube 10a and carried in ball bearings located in the walls of the gear box, only one such bearing, 41, being shown: oil seals and dust excluding devices not shown are located adjacent these bearings. At either side of the gear box 30 the shaft 40 carries bell-shaped deflector members 48, 49 whose smooth outer surfaces form, with the outer surface of the gear box 30 and the inner surface of the flared tube ends 20, 21 and ring 24, an annular passage 50 for the passage of the material being conveyed. The deflector members 48, 49 carry helical fins 51 of the same pitch as the auger described below, which extend into the passage 50 to assist conveyance of material therethrough.

An auger 52 (Figure 4) consisting of a sheet metal helix 53 secured to a tubular shaft 54 extends the length of the tube 10 and is divided into sections 52a and 52b corresponding to the tube sections 10a, 10b, adjacent ends of which are connected by a short rod 55 snugly received in the hollow shaft sections and secured thereto by bolts 56. The main auger section 52a is divided into two parts 57, 58 (Figure 2) the adjacent shaft ends of which carry reinforcing collars 59, 60 and snugly receive opposite ends of the gear box output shaft 40 to which they are secured by bolts 61.

The lower end of the auger 52 is not supported in a bearing but the upper end (Figure 3) is carried on a rod 65 snugly received by the hollow shaft 54 of the auger and mounted for rotation in a ball bearing 66 secured to the end wall 15 of the outlet member 14.

Figure 8:
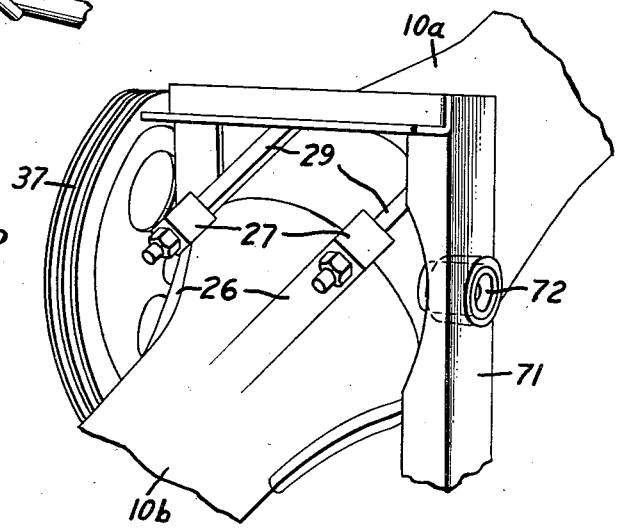
Figure 8 is a detailed view of certain parts shown in Figure 7.

A power unit 69 driving the pulley 37 by a belt 70 is secured to a cradle 71 (see especially Figures 1, 7 and 8) pivotally carried on trunnions 72, 73 (see especially Figure 2) formed by continuations of the struts 31, 32 and coaxial with the shaft 33. A rod 74 pivoted at 75 to the tube section 10a is detachably secured to the cradle 71 at 76, so as to steady it. Upon change of inclination of the auger conveyor 1 (e. g. by use of the winch 81 described below), the rod 74 is released and the cradle allowed to swing on its trunnions so as to bring the power unit 69 level, the rod is then secured to the cradle again. It will be appreciated that this swinging has no effect on the tension of the belt 70.

The A-frame 4 is pivoted at its small end 78 to the tube section 10a and at its larger end to the axle 79 of the transport wheels 3. The A-frame 5 is pivoted at its larger end on the axle 79 and its small end 80 slidingly engages the tube section 10a. A winch 81 secured to the tube section 10a near the end 78 of A-frame 4 is provided with a cord 82 secured to the A-frame 5 at its end 80, such that winding in the cord increases the angle of elevation of the conveyor 1. The lower end of the tube section 10a is provided with a skid 83.

The endless chain conveyor 2 comprises a frame designated generally 110 supported on a series of brackets 112 (Figures 1 and 6) two for each conveyor section 2a, 2a' and 2b, comprising a ring 113 formed in two parts secured together by bolts 114 so as to clamp the auger conveyor tube 10 between them, and a pair of leg members 115 secured to the upper part of the ring so as to form a V.

Two upper rails 116, in spaced parallel arrangement, are fastened to the upper ends of the leg members 115 so as to extend longitudinally of the conveyor and substantially parallel to the tube 10, except at the discharge end of said rails 116 where they are bent downwardly as indicated at 117. Between the rails 116 and the tube 10 two lower runners 118 are fastened in spaced parallel arrangement to the leg members 115 by means of short arms 119. These lower runners are adapted to support the lower or return run of an endless conveyor chain later to be described.

At spaced intervals in the length of the conveyor 2 transverse beams 120 are fastened to the upper rails 116, each of said beams having a downwardly curved central portion 121 and upwardly extending side arms to which are fastened longitudinal guide rails 122. Upper runners 123 (adapted to support the upper run of the endless conveyor) are secured to the beams 120 on opposite sides of the downwardly curved portion 121, and in substantially parallel arrangement, the upper runners 123 and the upper rails 116 being on substantially the same level—see Figure 6. The upper rails 116, lower runners 118, upper runners 123 and guide rails 122 are each made in three lengths so as to provide the conveyor sections discussed above, and the beams 120 are so disposed that there is one of said beams at each side of each division. At each division a jointing strap 124 is connected between these two beams 120 on each side so as to fasten the sections of the conveyor together.

Mounted beneath the upper runners 123, at the discharge end of the conveyor, are two transversely aligned tubes 125 (Figure 5) (in which only one tube is seen). Each of these tubes 125 has a nut 126 at one end, an adjusting screw 127 engaged in the nut 126, a lock nut 128 on the screw 127 and a slide bar 129 slidably mounted in the tube so that one end of the screw 127 will bear upon the bar 129 and hold it in position. The outer ends of the two slide bars 129 are fastened to a transverse axle 130 on which a chain sprocket wheel 131 is freely mounted.

At the input end of the machine (see Figure 1) a gear box and clutch combination 132 is secured to the upper runners 123. This combination provides a driving sprocket (not shown) and an input shaft carrying a pulley 133 which is connected by a V belt 134 to the double groove pulley 37. The belt 70 enters one groove of pulley 37 and the belt 134 enters the other groove, and for driving the chain conveyor 2 the pulley 37 is disconnected from the shaft 33.

An endless chain 141 is mounted to travel about the chain driving sprocket wheels of the gear box and clutch combination 132 and the idler sprocket 131, and fastened to said chain are a number of plates 142 in evenly spaced arrangement. Several of the plates 142, at equal intervals about the chain 141, have pushers 143 fastened to them in conventional manner. In the travel of the endless chain 141 the plates 142 ride on the upper runners 123 as they move from the input end of the machine to the output end; and after passing about the sprocket wheel 131 the plates 142 ride on the lower runners 118.

The manner in which the combination auger and chain conveyor may be used either as one or the other type of conveyor and the manner in which the various sections of either conveyor may be put together in various ways will be evident from the foregoing.

As the tube 10 of the auger conveyor also constitutes the main support member of the frame of the endless chain conveyor the members of the overhead frame may be made relatively light in section. Consequently, the overall weight of the composite, dual purpose machine will be relatively low. In normal usage on a farm it is not required to operate an auger conveyor, used in the bulk handling of grain, at the same time as it is required to use an endless-chain conveyor, used for the handling of baled hay. Consequently, the apparatus provided by this invention may be used for its dual purposes without the usage for one purpose interfering with the usage for the other purpose. As the period of usage of an auger conveyor on a farm is relatively short the apparatus will in general be used as an endless-chain conveyor, and then converted for use as an auger conveyor when grain or granular material is to be handled in bulk.

I claim:

1. An auger conveyor for bulk material comprising a straight tube having an enlarged portion intermediate in its length, a gear box mounted within the enlarged tube portion to allow passage of material in said tube portion past the gear box and having an input shaft extending to the exterior of the tube and an output shaft aligned with the tube, and a pair of augers together extending the greater length of the tube and located one upstream and one downstream of the gear box and operatively connected to the gear box output shaft, wherein the tube is formed in two parts having symmetrically flared adjacent ends and said gear box is carried by struts projecting radially inwardly of a ring receiving the extremities of said flared ends and forming therewith said enlarged portion of the tube.

2. An auger conveyor for bulk material comprising a straight tube having an enlarged portion intermediate in its length, a gear box mounted within the enlarged tube portion to allow passage of material in said tube portion past the gear box and having an input shaft extending to the exterior of the tube and an output shaft aligned with the tube, and a pair of augers together extending the greater length of the tube and located one upstream and one downstream of the gear box and operatively connected to the gear box output shaft, wherein the enlarged tube portion is symmetrical with the tube, the gear box is of circular cross section and is located symmetrically within said enlarged portion and the output shaft carries a pair of opposed generally bell-shaped members having smooth outer surfaces which in combination with the outer surface of the gear box and the enlarged portion of the tube define a smooth-walled annular passage for conveyed material past the gear box, said bell-shaped members carrying helical fins forming continuations of said upstream and downstream augers respectively.

3. An auger conveyor for bulk material comprising a straight tube having an enlarged portion intermediate in its length, a gear box comprising a casing, and input and output shafts extending therefrom, the casing being mounted within the enlarged tube portion and spaced therefrom to provide an annular passage for material in said tube portion past said casing, said input shaft extending to the exterior of the tube and said output shaft being aligned with the tube, and a pair of augers together extending the greater length of the tube and located one upstream and one downstream of the gear box and operatively connected to the gear box output shaft.

4. A portable conveyor as claimed in claim 3, including supporting means for the tube, adjustable to vary the inclination of the tube, a mounting ring rigid with the tube at said enlarged portion thereof, a pair of diametrally opposed struts projecting inwardly of the ring and carrying the gear box casing at their inner ends, the axis of the struts being horizontal in normal use of the conveyor said input shaft being rotatable coaxially within one said strut, a pair of coaxial extensions one on each strut and projecting outwardly of the tube, a power unit, a cradle pivotally mounted on said extensions and carrying the power unit, the center of gravity of the power unit and cradle lying below the axis of the extensions in normal use of the conveyor, endless flexible drive transmitting means connecting the power unit to the input shaft, and means to secure the cradle in angularly adjusted position relative to the tube, whereby the power unit may be maintained level notwithstanding varying inclination of said tube and without affecting the drive connection to the input shaft.

5. A portable auger conveyor for bulk material comprising a straight tube formed in at least two sections, an auger formed in sections corresponding in length to said tube sections, an enlargement in one of said tube sections, a gear box mounted within the enlarged portion to provide an annular passage therethrough for conveyed material and having an input shaft extending to the exterior of the tube and an output shaft operatively connected to the respective auger section, a power source carried by said one tube section and operatively connected to said input shaft, at least a pair of transport wheels connected to said one tube section, means detachably securing said tube and auger sections together respectively whereby said other section may be removed for conveyance of material by said one section only, means for detachably securing the tube and auger sections together in reverse order, and a tubular member detachably secured at one end to the output end of the tube and having an outlet for the discharge of conveyed material in its side, a bearing to carry the output end of the auger mounted in the other end of the member, and an element rotatably mounted in the bearing and having a detachable supporting connection with the end of the auger.

6. A combination auger and an endless conveyor comprising a straight tube formed in at least two sections, an auger formed in sections corresponding in length to said tube sections, an enlargement in one of said tube sections, a gear box mounted within the enlarged portion to provide an annular passage therethrough for conveyed material and having an input shaft extending to the exterior of the tube and an output shaft operatively connected to the respective auger section, a power source carried by said one tube section and operatively connected to said input shaft, at least a pair of transport wheels connected to said one tube section, means detachably securing said tube and auger sections together respectively whereby said other section may be removed for conveyance of material by said one section only, means for detachably securing the tube and auger sections together in reverse order, an endless conveyor running adjacent and parallel to the tube, and means for connecting the power source to the endless conveyor, said endless conveyor being formed in sections corresponding to the tube sections and detachably secured together and to the tube sections.

References Cited in the file of this patent

UNITED STATES PATENTS

| | | |
|---|---|---|
| 2,360,776 | Kozak et al. | Oct. 17, 1944 |
| 2,528,917 | Slocum | Nov. 7, 1950 |
| 2,533,261 | Howe | Dec. 12, 1950 |
| 2,550,904 | Bernard | May 1, 1951 |
| 2,610,727 | Beldin | Sept. 16, 1952 |